Figure 1:
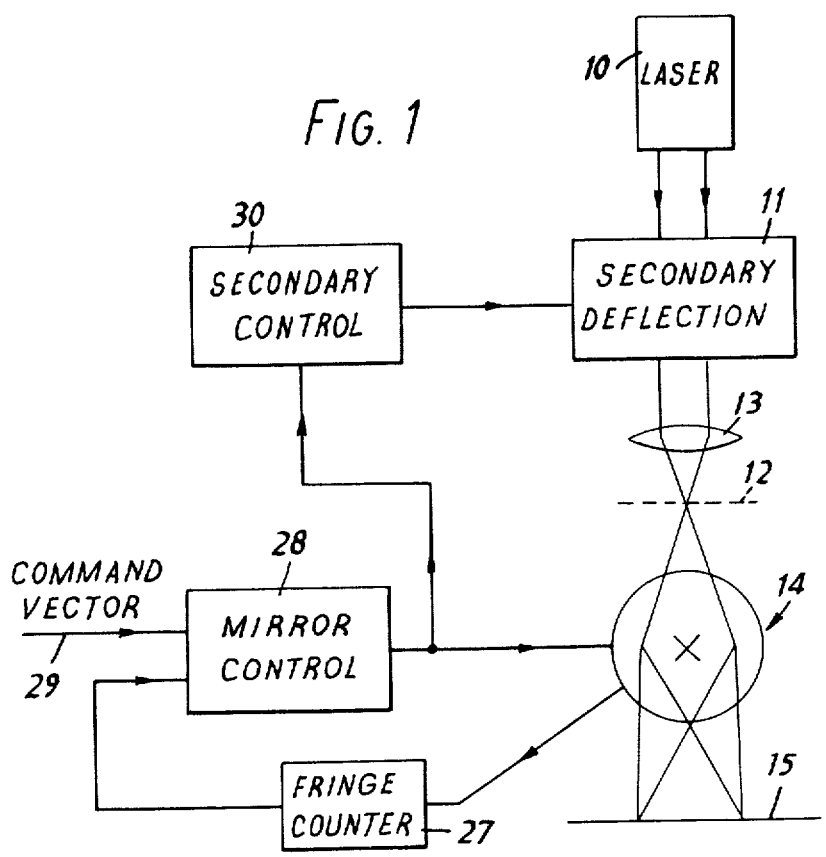

United States Patent [19]

Street

[11] 3,896,362

[45] July 22, 1975

[54] LIGHT-BEAM STEERING APPARATUS

[76] Inventor: Graham Stewart Brandon Street, 115, Perse Way, Cambridge, England

[22] Filed: Nov. 30, 1972

[21] Appl. No.: 310,679

Related U.S. Application Data

[63] Continuation-in-part of Ser. No. 82,643, Oct. 21, 1970, abandoned.

[52] U.S. Cl. .............. 318/640; 318/594; 346/108
[51] Int. Cl. ............................................. G05b 1/06
[58] Field of Search ........................... 318/640, 594

[56] References Cited
UNITED STATES PATENTS

| | | | |
|---|---|---|---|
| 3,394,293 | 6/1968 | Taniguchi et al. | 318/640 X |
| 3,588,662 | 6/1971 | Buebel, Jr. | 318/593 X |
| 3,634,682 | 1/1972 | Gold | 318/640 X |
| 3,651,932 | 3/1972 | Frisch et al. | 318/640 X |
| 3,719,879 | 3/1973 | Marcy | 318/593 |

OTHER PUBLICATIONS
IBM Technical Disclosure Bulletin, Vol. 11, No. 11, April 1969, Ogden et al., Automated Positioning Sys. p.p.s. 1454 & 1455.

*Primary Examiner*—T. E. Lynch
*Attorney, Agent, or Firm*—Woodhams, Blanchard and Flynn

[57] ABSTRACT

A light-beam steering apparatus comprising at least one steering mirror positioned in the path of a light beam. A servo-control controls the steering mirror in response to a command signal input and a feedback input responsive to steering mirror position, determines the error between the command and feedback signals and controls the movement of the mirror in dependency upon such error. A secondary deflection system is provided for fine control of the position of the beam and precedes the mirror. A control circuit coupled between the error determining portion of the servo-control and the secondary deflection system causes the secondary deflection system to correct the light-beam position in accordance with such error.

22 Claims, 9 Drawing Figures

LIGHT-BEAM STEERING APPARATUS

CROSS REFERENCE TO RELATED APPLICATION

The present application is a continuation-in-part of my, copending application Ser. No. 82,643, filed Oct. 21, 1970, now abandoned.

The present invention relates to apparatus for steering a light beam, for example, a laser beam, for the purpose of recording or for the purpose of examining an existing recording.

It is known that steered light beams may be used for examination of photographic records, for example, bubble-chamber photographs showing tracks of elementary particles. These commonly use a scanning technique in which the beam is caused to execute a raster scan over the whole area of the record. In U.S. Pat. No. 3,651,392 of Frisch and Street a system is described in which the beam is caused to follow individual tracks on the record.

It is likewise known to use a steered light beam for recording. In addition to conventional photo-sensitive materials the record can be formed on photo-chromic materials to obtain termporary records. When the light beam is a laser beam it can be of sufficient intensity to form a record by etching a metal plate or film or by distorting the surface of a thermoplastic material. In recording apparatus it is known to use two deflecting systems for the light beam, one for locating the beam in a particular area of the recording medium and the other for drawing a character or symbol in that area. Either or both deflection systems may operate in accordance with the scanning principle and the recording is controlled by modulating the intensity of the beam.

The speed of operation of such recording systems is limited by the speed of the locating or positioning deflection system. Because this must be capable of relatively large deflections it necessarily has substantial inertia and is relatively slow to achieve the exact position required. This positioning deflection system is commonly formed by rotating or swinging mirrors. To achieve accurate positioning with such a system, requires the movement of the mirrors to be damped and thus further slows up the operation. Only when the position has been established by the positioning deflection system can the local drawing deflection system be brought into operation. This can conveniently be an electro-optical system giving small deflections at high speed.

The present invention seeks to provide a light-beam steering apparatus capable of operating with high speed and accuracy which will be suitable, inter alia, for use in a high speed data plotter for computer output and which is capable both of tracing lines over relatively large areas and tracing symbols arranged in a prescribed pattern. This is achieved by controlling the main deflection system, which gives the larger deflections, by means of a servo-mechanism and using the error signal from the servo-mechanism to control the secondary deflection system, which is capable only of small deflections but executes these at high speed to provide continuous correction of the position of the beam which is established by the main deflection system. Accuracy is now ensured at all times by the secondary system and the main system can therefore be operated at its maximum speed without the need for the main system to come to rest at a precisely known position. It may still be convenient when drawing symbols to use the secondary deflection system for this purpose by applying appropriate control signals directly to the secondary deflection system, these being either superimposed on or substituted for the error signals from the servo-mechanism but when drawing on a larger scale the co-operation of the main and secondary deflection systems gives a unique combination of speed and accuracy.

In a preferred form of the invention, the servo-mechanism inputs for the main deflection system are in the form of digital command signals for a computer representing the magnitudes of the vector components of the required movement and digital feed-back signals from interferomoters responsive to movement of the main steering mirrors. The error signal is generated in digital form and can be applied to the mirrors through a digital or analogue control circuit which introduces a velocity-dependent damping term.

When recording, the intensity of the beam must be modulated in accordance with the velocity of tracing in order to obtain a uniform recorded density. This is achieved in a preferred form of the invention by recording a line as a series of dots laid down at equal spacing along the line by means of a circuit which calculates from the command signals the extent of movement of the beam along the line and issues a bright-up pulse to a beam intensity modulator on completion of each equal step length along the line.

Figure 2:
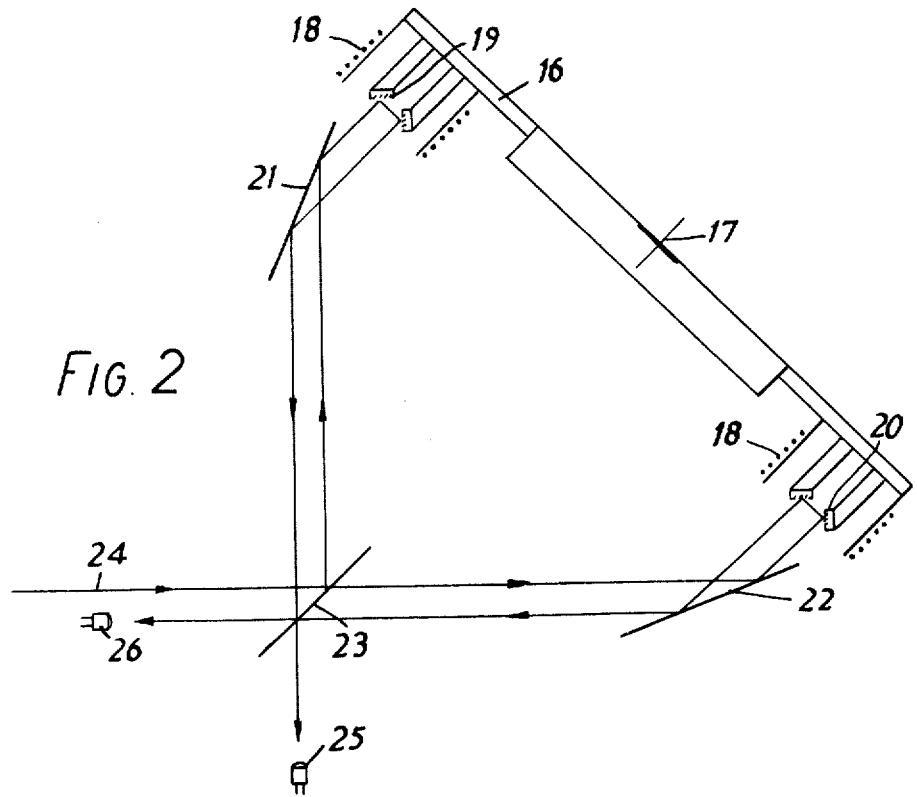
Figure 3:
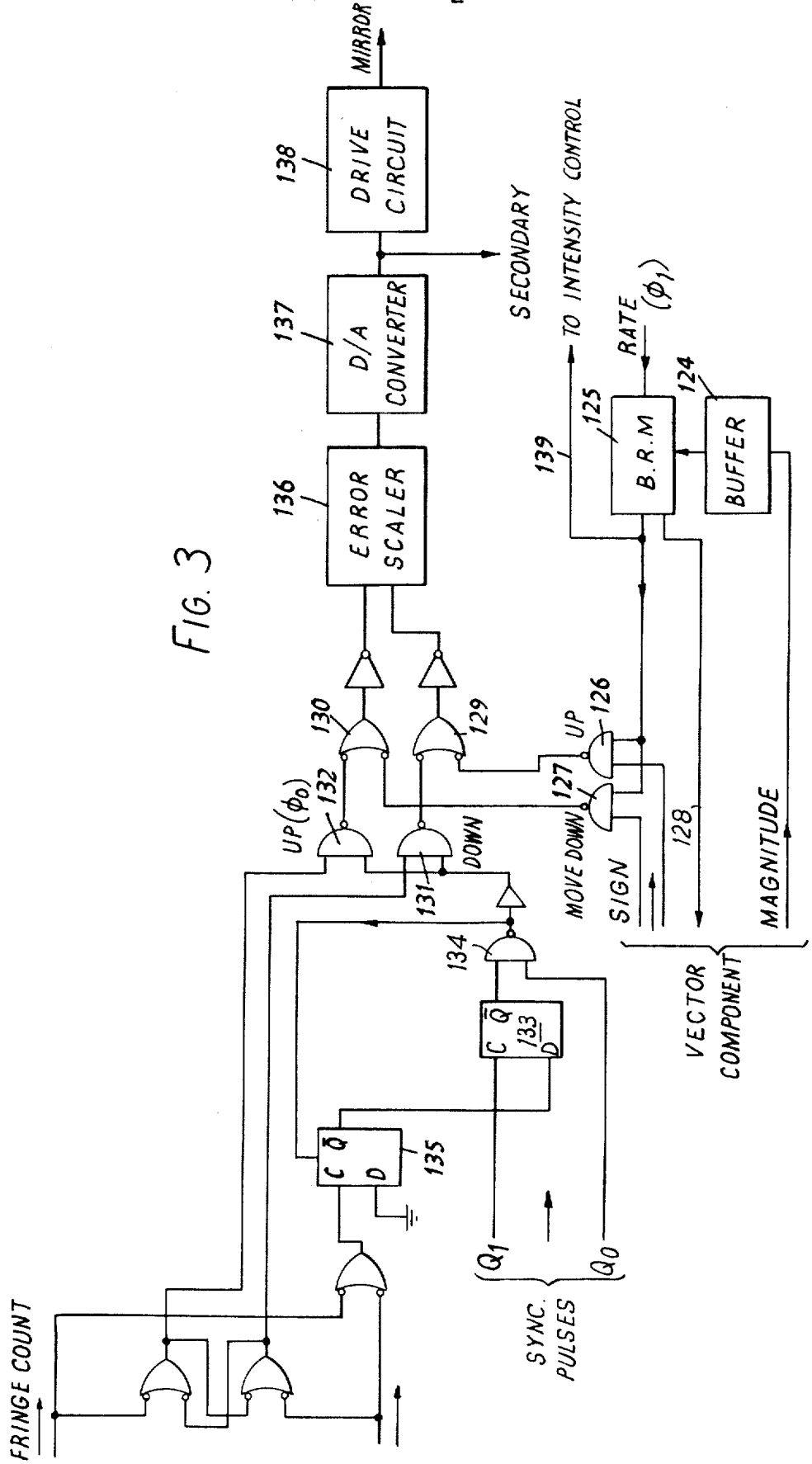
Figure 4:
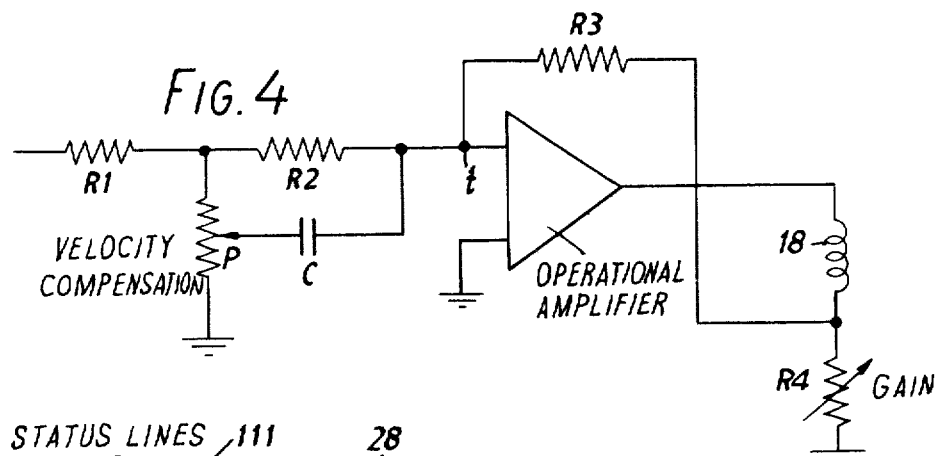
Figure 5:
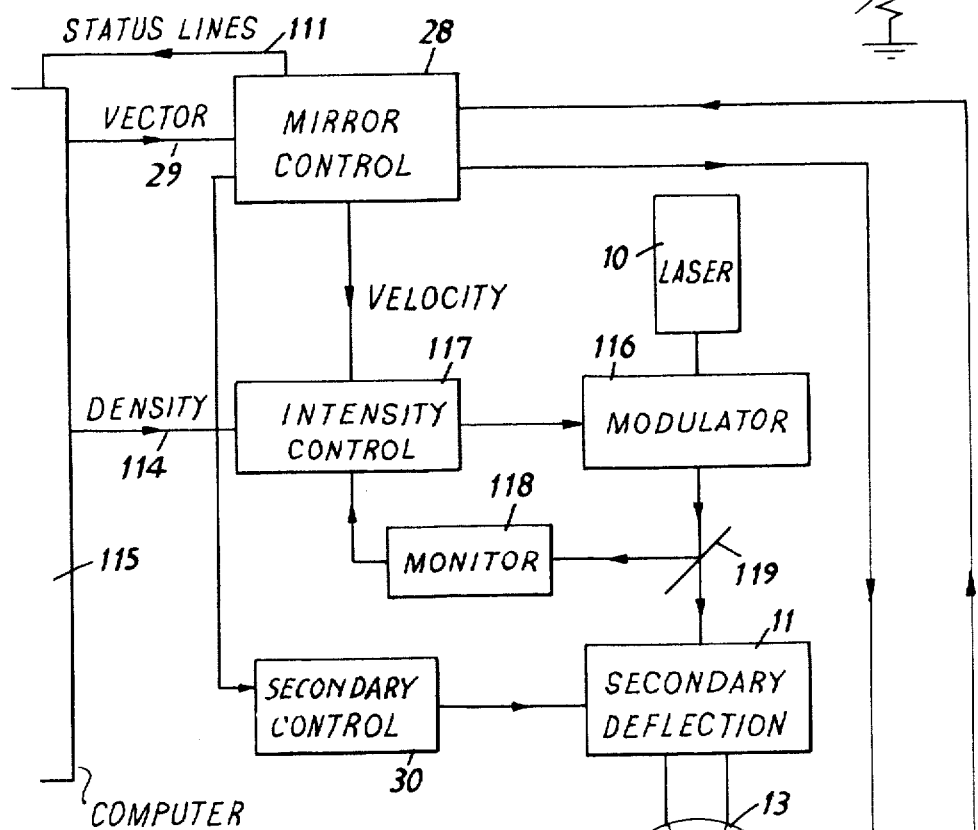
Figure 5:
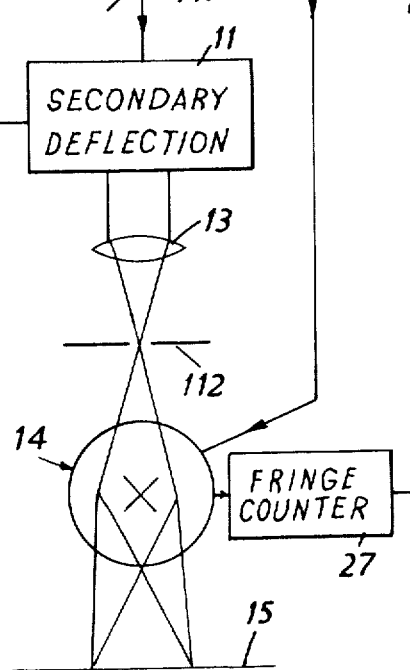
Figure 6:
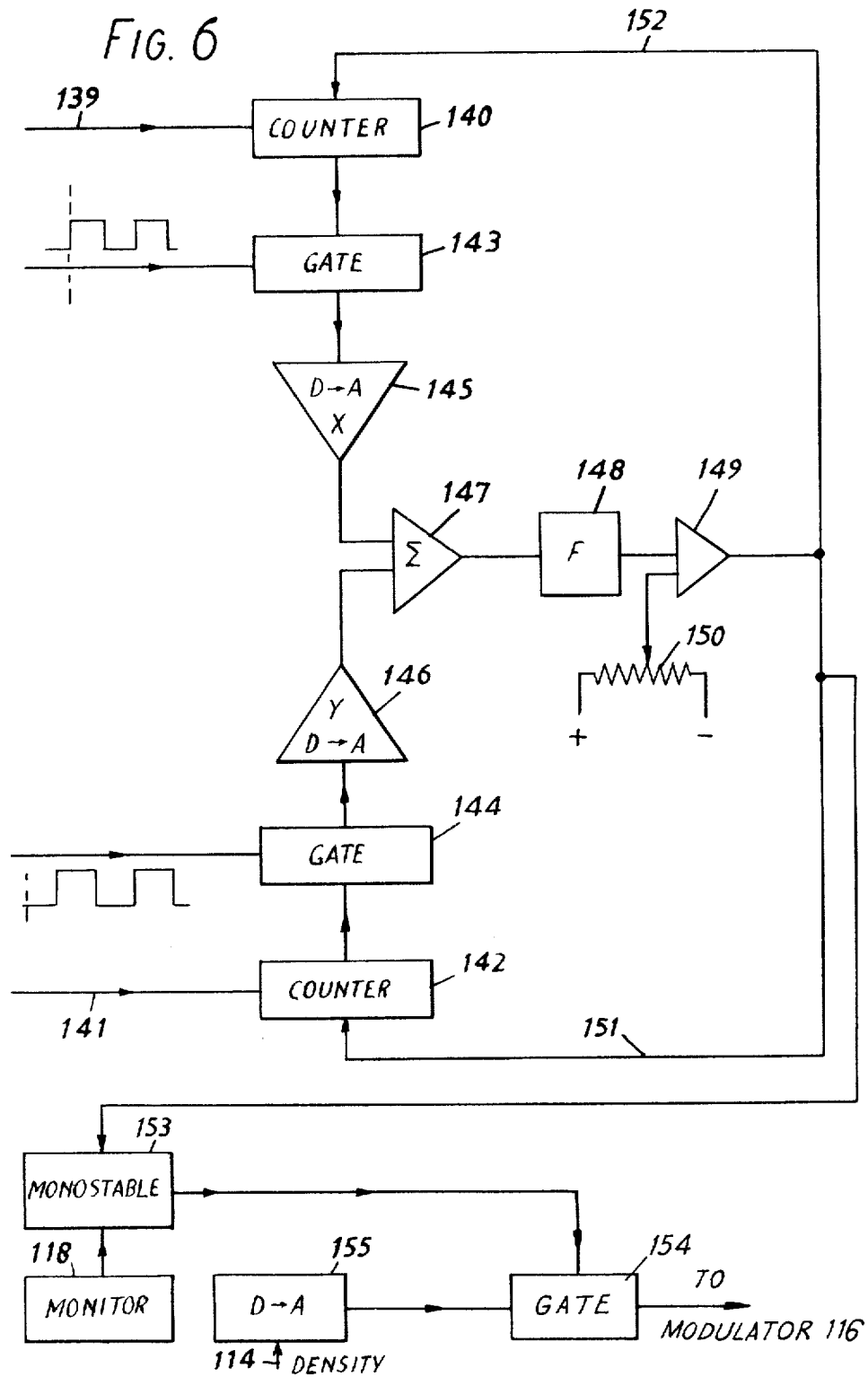
Figure 7:
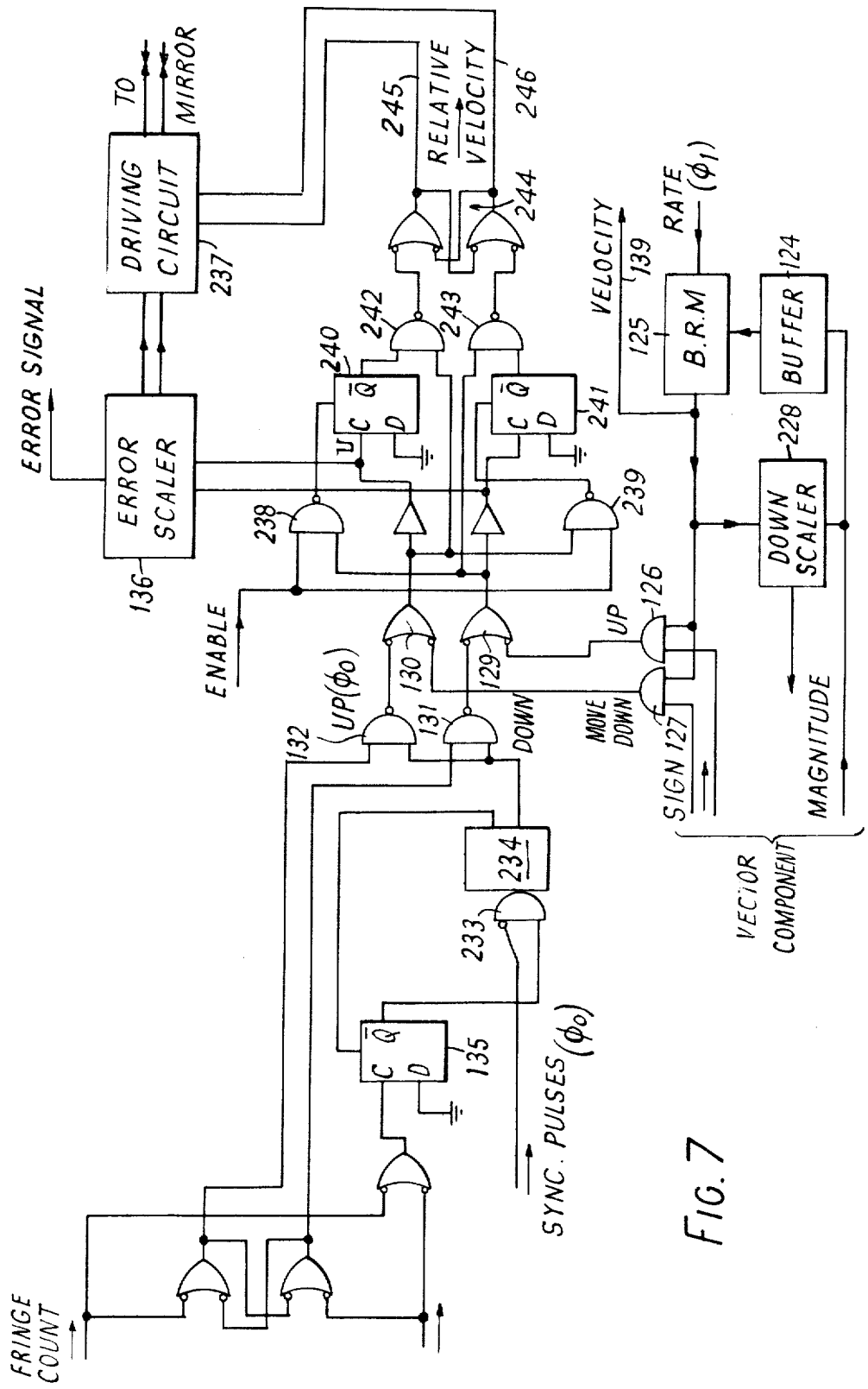
Figure 8:
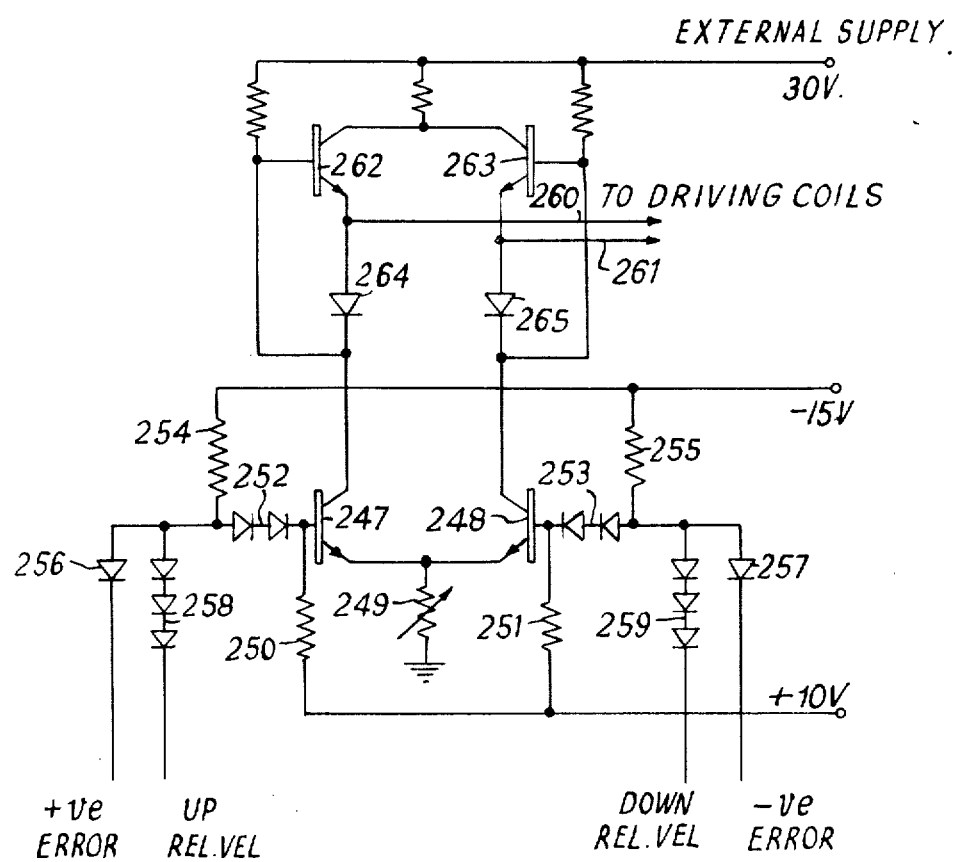
Figure 9:
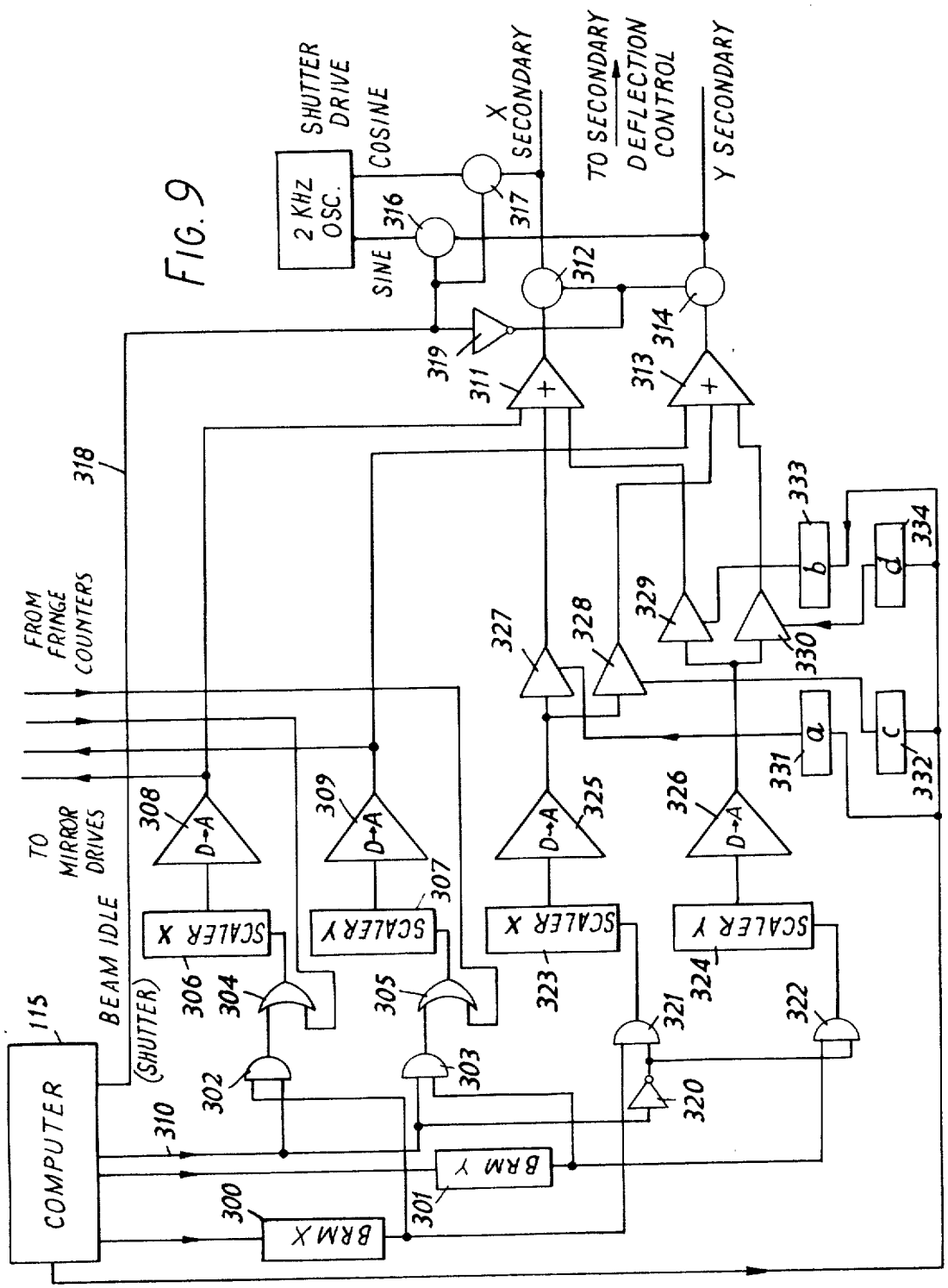

The invention will now be described in more detail with the aid of examples illustrated in the accompanying drawings, in which:

FIG. 1 shows diagrammatically a light-beam steering system in accordance with the invention, FIG. 2 shows one of the steering mirrors used in the system of FIG. 1 with the optical system for detecting movements of the mirror, FIG. 3 shows in more detail the circuits employed in the mirror control of FIG. 1, FIG. 4 is a detail of a drive circuit for use in the arrangement of FIG. 3, FIG. 5 shows diagrammatically a recording apparatus including a light-beam steering system in accordance with the invention similar to that of FIG. 1 and means for controlling the intensity of the recording beam, FIG. 6 shows details of the circuits employed to control the intensity of the beam in the apparatus of FIG. 5, FIG. 7 shows a digital mirror control circuit which may be used in place of the circuit of FIG. 3, FIg. 8 shows the digital driving circuit forming part of the arrangement of FIG. 7, and FIG. 9 shows schematically a form of mirror control circuit incorporating additional facilities for control of the beam movements through the secondary deflection system.

Referring first to FIG. 1 there is shown a laser 10 serving as a light source which generates a narrow beam of light. The light beam from the laser 10 passes through a secondary deflection system 11 and is brought to a focus in a plane 12 by a lens 13. It then passes to a main deflection system 14 and from there to a surface 15 which may be either a surface carrying recorded information which is to be read by the beam or a surface on which information is to be recorded. The main deflection system 14 is shown diagrammatically as having only a single mirror but in practice consists of two main steering mirrors arranged one after the other in the path of the light beam and usually mounted for angular defelction about perpendicular axes to deflect the beam along X and Y axes on the surface 15. For clarity much of the description which follows relates only to the steering of the beam in one direction, say along the X axis, but it will be understood that the apparatus for steering in the X direction is duplicated for steering the beam in the Y direction. For example, the secondary deflection system may include separate deflection devices for controlling the beam in the X and Y directions.

It will be seen by reference to FIG. 2 that the main deflection system 14 has a mirror 16 for deflection in the X direction which is mounted on crossed springs 17. Driving coils 18 are mounted on the back of the mirror 16 and are disposed in a magnetic field (not shown) such that the mirror can be angularly displaced about the mounting springs 17 by the passage of appropriate currents through the driving coils 18. To detect the resulting movements of the mirror 16 an interferometer is provided which comprises two sets of V-mirrors 19 and 20 mounted on the back of the mirror 16 within the driving coils 18, a pair of fixed mirrors 21 and 22, and a fixed half-silvered mirror 23. A beam of light 24 derived from any convenient source, for example from the laser 10, falls on the mirror 23 and is split into two beams which are reflected by the mirrors 21 and 22 respectively and fall on the sets of V-mirrors 19 and 20. These mirrors have the property of returning the beam along the same path and the two beams are thus returned by the mirrors 21 and 22 to the mirror 23. Interference fringes are therefore produced in the same manner as in a Michelson interferometer and these are detected by photo-cells 25 and 26. Displacement of the steering mirror 16 changes the path length for the two interfering beams and thus results in shifting of the interference fringes. The outputs of the photo-cells 25 and 26, which are arranged to be 90° out of phase are passed to a fringe counter 27 (FIG. 1) which in response to the shifting of the interference fringes produces trains of electrical pulses representing the direction and magnitude of the movement of the mirror 16.

Further details of the main steering system 14 will be found in a paper entitled "Sweepnik: a fast semi-automatic track-measuring machine" in "Nuclear Instruments and Methods" 82 (1970), pp. 54–60 and in U.S. Pat. NO. 3,651,392 of Frisch and Street. Essentially it consists of X and Y steering mirrors which are independently positionable by the supply of appropriate driving currents to their driving coils and whose movements are separately monitored by respective interferometers which generate a digital feed-back signal representing the movement of the respective steering mirror.

The position of each steering mirror is controlled by a mirror control circuit 28 (FIG. 1) in response to a command vector applied to it on a line 29. The command vector, which can be supplied by a computer or similar overall control mechanism or in a simple case can be generated directly by the operator of the equipment, represents the magnitude and direction of the required movement of the steering mirror. The mirror control circuit 28 compares the command vector, on the line 29, which is in digital form, with the feed-back signal from the fringe counter 27 and generates an error signal which controls the driving currents supplied to the driving coils 18. The main deflection system 14 is thus under servo-control. The inertia of the steering mirrors limits its speed of response and the proportional nature of the servo-control means that the positional errors will never be reduced beyond the point at which the servo forces are equal and opposite to the out-of-balance forces or restoring forces produced by the mirror mountings. To correct the inherent errors which are present in such a system and thereby to ensure that the light beam is rapidly and accurately steered to the precise position required, the invention provides the secondary deflection system 11 which is controlled by the error signal output of the mirror control circuit 28 by way of a secondary control circuit 30. The secondary deflection system 11 has only to make small corrections to the position established by the main deflection system 14 and can thus be constructed to have a very high speed of response. The secondary deflection system can be in the form of an electro-optical device such as that described in, for example, British Pat. Specification No. 1,012,430. Alternatively, it can include a pair of very small suspended mirrors for the X and Y deflections as described in U.S. Pat. application Ser. No. 260,285 of G. S. B. Street, filed June 6, 1972.

FIG. 3 shows in logical and block diagram form the mirror control circuit 28 of FIG. 1 for the X steering mirror. Conventional symbols are used for the circuit logic and it is therefore not necessary to describe every detail of this circuit. The command from the computer is in the form of a series of vector components represented digitally. The digital count representing the absolute magnitude of a compenent is placed in a buffer store 124 from which it is fed to a binary rate multiplier (B.R.M.) 125 which also receives rate-determining pulses $\phi_1$ from a clock which represent the required speed of movement of the beam from one position to another. The otput from the B.R.M. 125, representing the required velocity of movement along one co-ordinate direction; is fed to two AND gates 126 and 127 one or other of which also receives an input from the computer in accordance with the sign of the vector component. Thus there is an output on the UP or DOWN line from the gate 126 or 127 respectively, which commands a movement in one direction or the other. The B.R.M. 125 generates a triggering signal on a line 128 when in the zero state on completion of a move to cause the next vector component to be placed in the buffer 124.

The outputs from the UP and DOWN 126 and 127 are applied to OR gates 129 and 130 respectively, which also receive inputs from DOWN and UP AND gates 131 and 132, respectively, which transmit trains of pulses from the fringe counter 27 in accordance with the actual movement of the mirror. To avoid confusion betweeen the pulses from the fringe counter and those from the binary rate multiplier 125 each pulse from the counter is slightly delayed and synchronised with the aid of synchronising pulses $\phi_0$ and $\phi_1$, 90° out of phase, from a timing clock, the pulses from the fringe counter being thus displaced in phase relative to those from the B.R.M. 125. The synchronising pulses $\phi_1$ and pulses from the fringe counter are applied to two inputs of a D-type edge-triggered flip-flop 133. The output from the flip-flop 133 is passed to an AND gate 134, which also receives the synchronising pulses $\phi_0$. The output of the gate 134 is passed by way of an inverter to the gates 131 and 132 and also serves to reset a D-type edge-triggered flip-flop 135 through which the pulses from the fringe counter are fed to the flip-flop 133.

The pulses from the OR gates 129 and 130 are applied to an error scale 136. The pulses from teh fringe counter 27 are in opposition to those from the B.R.M. 125. When the mirror is moving exactly as required the pulses from the two sources alternate and there is no change in the condition of the error scaler 136. When the mirror movement is out of step with the requirements represented by the vector component input the count in the error scaler changes in proportion to the error. The direction of the error is shown by the most significant bit in the error scale 136. The output of the error scale 136 is passed to a digital-to-analogue convertor 137 which converts it into an analogue error signal which is applied on the one hand to the secondary deflection control 30 and on the other hand to a drive circuit 138 controlling the drive current to the main steering mirror.

The drive circuit 138, which is shown in detail in FIG. 4, is a conventional circuit which introduces a velocity-dependent damping into the operation of the servo system. The analogue output from the digital-to-analogue converter 137 is applied by way of resistors R1 and R2 to an input terminal $t$ of an operational amplifier of type SN 72 741N whose output is fed to the driving coil 18 of the steering mirror. A feed-back resistor R3 is connected to the input terminal $t$ and to the junction between the coil 18 and a variable resistor R4 which allows the gain of the amplifier to be controlled. A capacitor C and a potentiometer P connected across the resistor R2 provide a velocity-dependent term which is added to the error signal input.

The apparatus shown in FIG. 5, which is a light-beam recording system, uses the same components for steering the beam as those shown in FIG. 1 and the same reference numerals have been used for corresponding components, which will not be further described. The computer which provides the command vector on the line 29 is indicated at 115. The mirror control circuit 28 is coupled to the computer 115 by status lines 111 which convey status signals to the computer. A diaphragm 112 is shown in the focal plane of the lens 13 for a purpose which will be described below.

An intensity modulator 116 is interposed between the laser 10 and the secondary deflection system 11. The intensity modulator 116, which may be a Pockel cell, controls the intensity of the beam in accordance with signals from an intensity control circuit 117. The circuit 117 receives an input on line 114 from the computer 115 representing the required density of the trace on the recording medium 15. It also receives an input from the mirror control circuit 28 representing the velocity at which the beam is being traced over the recording medium. For a given density of trace a higher intensity will be necessary to compensate for an increase in the velocity of tracing in order to give the same exposure and hence the intensity control circuit 117 is designed to vary the intensity in proportion to the product of the density and velocity inputs. The modulated intensity is monitored by a photoelectric monitor device 118 on to which a part of the beam is directed by a partially-reflecting mirror 119. The output of the monitor device 118 forms a feed-back signal to the control circuit 117.

In a preferred form of the invention the modulator 116 comprises a Wollaston prism which splits the laser beam into two components with different polarizations which follow slightly different paths. One component is used as the writing beam and its intensity is modulated by varying the distribution of energy between the two components. The other component is used for monitoring the intensity of the laser beam in the periods when the writing beam is at minimum intensity.

The intensity control circuit 117 is shown in FIG. 6. It has to take into account the actual movement of the beam across the recording medium and for this purpose is supplied with move control pulses from the mirror control circuit representing both the X and Y movements of the beam. Thus the output pulses of the B.R.M. 125 (FIG. 3) of the X-deflection mirror control circuit are supplied by a line 139 to a 4-bit counter 140 of type SN 7493N. These pulses represent by their number and rate the extent and rate of movement commanded in the X-direction and thanks to the action of the secondary deflection system it can be assumed that the beam moves exactly in accordance with these commands. The count in the counter 140 thus represents the extent or magnitude of the X-deflection. Similarly, the parallel mirror control circuit for the Y-deflection delivers move control pulses on a line 141 to a counter 142, also of type SN7493N. The counters 141 and 142 are connected through respective gates 143 and 144 to an X digital-to-analogue converter 145 and a Y digital-to-analogue converter 146, respectively. The gates 143 and 144, of type 7408, are controlled by gate pulses in the form of a square wave of frequency w, the gate pulses to the two gates being 90° out of phase.

The counts in the counters 140 and 142 represent displacements $\Delta X$ and $\Delta Y$ of the mirrors of the main steering system 14. Because these two mirrors are at different distances from the surface 15 the actual displacements of the beam acorss the surface can be represented as $\sqrt{a}\,\Delta X$ and $\sqrt{b}\,\Delta Y$ giving a resultant of magnitude of $\sqrt{a\,(\Delta X)^2 + b\,(\Delta Y)^2}$. The appropriate resultant magnitude is obtained in the circuit of FIG. 6 by summing a sine wave of amplitude $\sqrt{a}\Delta X$ and a cosine of amplitude $\sqrt{b}\Delta Y$. The sine and cosine terms are provided by the gates 143 and 144 and the amplitudes are set by the digital-to-analogue converters 145 and 146, which have variable gain. The two analogue signals are then combined by a summing amplifier 147 and put through a filter 148 tuned to the frequency $\omega$ of the gating pulses. The output from the filter 148 is thus the sum of the first order harmonics $\sqrt{a}\,\Delta X \sin \omega + \sqrt{b}\,\Delta Y \cos \omega$ of the square waves having the required amplitude of $\sqrt{a\,(\Delta X)^2 + b\,(\Delta Y)^2}$. This is applied to a sense amplifier 149 which has a threshold value set by a potentiometer 150. This threshold value is set such that when the beam has moved a distance across the surface 15 equal to the size of the writing beam, typically $12\mu (12 \times 10^{-6}$ metre), the sense amplifier 149 triggers and, if a recording is required at that point by the controlling signals from the computer 115, a bright-up pulse is applied to the modulator 116. When the sense amplifier 149 triggers it resets the counters 140 and 142 by way of the lines 152 and 151 Hence, a bright-up pulse is issued on the completion of each step of $12\mu$ in the movement of the beam across the recording medium. Dots are recorded at uniform intervals to produce a line of uniform intensity along its length.

The trigger signal from the sense amplifier 149 sets a monostable 153 which controls the length of the bright-up pulse. The output from the monostable 153 is applied to a control gate 154. The intput to the gate is provided by a digital-to-analogue converter 155 in dependence upon the density signal on the lines 114 from the computer. Thus, the amplitude of the bright-up pulse is varied to control the density of the trace on the recording medium. The output of the gate 154 passes to the modulator 116. The monitor 118 resets the monostable 153 at the end of each bright-up pulse, changing the length of the bright-up period if necessary to compensate for changes in the intensity of the light source.

The speed of movement of the beam across the recording medium should not be so great in relation to the length of the bright-up pulse that a second bright-up pulse is called for before the first is terminated. If necessary, the apparatus by which the computer controls the speed of beam can be provided with inhibiting facilities to prevent overlap between bright-up pulses Referring now to FIG. 7, this shows an alternative form of the mirror control circuit shown in FIG. 3. The same reference numerals are used for the same parts in the two drawings and it will not be necessary to repeat the description of these parts.

In the embodiment of FIG. 7 a down scaler 228 is provided to generate the triggering signal on completion of a move which causes another vector component to be placed in the buffer 124. The down scaler 228 is initially loaded with the magnitude input from the computer and the output of the B.R.M. 125 is applied to it.

The synchronization of the pulses from the fringe counter is effected with a single train of synchronsing pulses $\phi_0$ which are applied to an enabling gate 233 of a monostable circuit 34. One output from the monostable circuit 234 controls the gates 131 and 132. The other output resets the flip-flop 135 through which the pulses from the fringe counter are fed to the gate 233.

The pulses from the OR gates 129 and 130 in the circuit of FIG. 7 are fed to the error scaler 136 which supplies the error signal to the secondary deflection control circuit 30 and also feeds a driving circuit 237 which provides the driving currents for the main mirror system 14. The pulses from the fringe counter 27 are in opposition to those from the B.R.M. 125 and when the mirror is tracking correctly at the rate required by the B.R.M. the pulses from the two sources alternate. The required direction of drive to the mirror is determined by the most significant bit in the error scaler 136. The sign of the input vector component determines whether the UP or DOWN line carries pulses. If the mirror moves ahead of the position prescribed by the B.R.M. the additional pulses reaching the error scaler 136 from the fringe counter 27 result in an output to the driving circuit which reverses the drive to the mirror. At the same time a relative velocity signal is applied to the driving circuit 237 to produce a large driving current so that movement of the mirror away from the prescribed position is rapidly damped or braked. The relative velocity signal which represents the actual velocity of the mirror relative to its prescribed velocity, is derived from the output of the OR gate 129 or 130 which passes by way of a gate 238 or 239 to the pre-set terminal of a D-type edge-triggered flip-flop circuit 240 or 241, respectively, and also directly to the clock terminal of the flip-flop circuit 240 or 241 respectively.

The outputs of the two flip-flop circuits 240 and 241, which are triggered on the positive trailing edge of the input pulses, are so coupled with gates 242 and 243 and a further flip-flop 244 that a relative velocity signal is produced on one or other of lines 245 and 246 connected to the driving circuit whenever two pulses in succesion are received from the fringe counter or the B.R.M. without a compensating pulse from the other source between these pulses. The relative velocity signal, when of the same sign as the signal from the error scaler 136, causes the driving circuit to feed a high driving current to the mirror system to decelerate movement of the mirror away from the position prescribed by the B.R.M. 125. Upon reversal of the relative velocity so that the mirror, while still ahead of the prescribed position, is moving back towards the prescribed position, the driving current is switched to a low value but remains in the same direction because the error scaler continues to indicate that the mirror is ahead of the prescribed position.

Referring now to FIG. 8, the driving current comprises transistors 247 and 248 whose emitters are connected in common through a variable resistor 249 to earth. The bases of the transistors 247 and 248 are connected by way of respective resistors 250 and 251 to a positive line and also by way of pairs of diodes 252 and 253, respectively, and by resistors 254 and 255, respectively, to a negative line. The signals from the error scaler 136 are applied to the junction of the diodes 252 and resistors 254 by way of a diode 256 or to the junction of the diodes 253 and the resistor 255 by way of a diode 257 and serve to select one or other of the transistors 247 and 248 to supply a driving current in the appropriate sense to the mirror system. In addition, the relative velocity signals cause one or other of two groups of diodes 258 and 259 to be selected and when the actual direction of movement is away from the position prescribed by the B.R.M., an increased current is fed to the driving coils by the transistor 247 or 248 by reason of the change in base voltage due to the diodes 258 or 259. It is preferable to have three diodes in each group, each of these diodes being the same as the diodes 256 and 257.

The circuit of FIG. 8 includes provision for ensuring that at any given moment current can only flow through the driving coils in one direction. Two lines 260 and 261 leading to the driving coils are associated with respective transistors 262 and 263 in whose emitter circuits respective diodes 264 and 265 are connected. When, for example, transistor 247 is conducting and current flows in the circuit from earth, through transistor 247, diode 264 and line 260 to the driving coil and back by way of line 261 and transistor 263 to the negative supply terminal, the transistor 262 is cut off to prevent current flow between the line 260 and the negative supply terminal and the diode 265 prevents return flow to the transistor 248. When the current is reversed by selection of transistor 248, the transistor 262 is conducting and transistor 263 is cut off.

FIG. 9 shows in schematic outline form the mirror control circuit for both X and Y deflections. The computer 115 supplies command vector components to a B.R.M. 300 for the X deflection and a B.R.M. for the Y deflection. The outputs from the B.R.M.s. 300 and 301 pass by way of gates 302 and 303, respectively to OR gates 304 and 305, respectively, which also receive inputs from the corresponding fringe counters and which feed error scalers 306 and 307 for the X and Y deflections, respectively. The error scalers 306 and 307 control the mirror drives by way of respective digital-to-analogue converters 308 and 309 whose outputs are also applied, in a manner to be explained below, to the secondary deflection control circuits. The circuit described thus far is a simplified representation of the circuit of FIG. 3, duplicated to control both X and Y deflections. When the gates 302 and 303 are enabled by appropriate signals from the computer 115 on the line 310 the circuit operates as previously described.

The output from the digital-to-analogue converter 308 is passed to the X secondary control circuit by way of a summing amplifier 311 and a switch 312. Similarly the output of the digital-to-analogue converter 309 is passed to the Y secondary control circuit by way of a summing amplifier 313 and a switch 314. A 2KHz oscillator 315 delivers sine and cosine output signals to switches 316 and 317 respectively. The switches 316 and 317 are controlled in alternation with the switches 312 and 314 by a signal from the computer 115 on a line 318 which is connected to the switches 312 and 314 by way of an inverting amplifier 319. Each of the switches 312, 314, 316 and 317 may be a field effect transistor analogue switch. The signal on the line 318 normally holds the switches 312 and 314 open to allow control of the secondary deflection and the switches 316 and 317 are closed. When the beam is not required to effect a recording a "beam idle" signal on the line 318 closes the switches 312 and 314 and opens the switches 316 and 317 to apply the sine and cosine signals from the oscillator to the X and Y secondary deflection circuits, thus causing the beam to execute a small circular movement. The diameter of the circle is such that the beam does not pass through the aperture in the diaphragm 112 (FIG. 5) which thus acts as a shutter to completely prevent recording. This is necessary because the modulator 116, though having a large ratio of some 500 to 1 between the maximum and minimum intensities transmitted, is not capable of complete extinction of the beam.

The remainder of the circuit of FIG. 9 allows the control of the deflection by the main deflection system 14 to be supplemented by a localised control exercised wholly through the secondary system. Such control of movement within a small region of the recording medium is valuable for plotting symbols and characters. Facilities are included for rotation and scaling of the recorded symbols and characters. This localised high-speed control of the secondary deflection is superimposed on the basic control exercised by the main control system and the secondary control system in combination.

The enabling signal from the computer to the gates 302 and 303 on the line 310 is also applied by way of an inverter 320 to gates 321 and 322 which connect the B.R.M.s. 300 and 301 to error scalers 323 and 324, respectively. The outputs of the error scalers 323 and 324 are supplied to respective digital-to-analogue converters 325 and 326. The digital-to-analogue converter 325 is connected by way of a multiplier 327 to the amplifier 311 and by way of a multiplier 328 to the amplifier 313. Similarly, the converter 326 is connected by way of a multiplier 329 to amplifier 311 and by way of a multiplier 330 to the amplifier 313. The second inputs to the multipliers 327 to 330 are provided by registers 331 to 334 respectively, which are fed by the computer with a matrix of numbers a, b, c and d with which the signals from the scalers 323 and 324 are to be multiplied. Thus, if $X_2$ and $Y_2$ represent the values in the scalers 323 and 324, the outputs to the X and Y secondary deflection systems are respectively $a X_2 + b Y_2$ and $c X_2 + d Y_2$. Pure rotation of the characters is effected when $a = d$ and $b = -c$ and ad $-$bc $= 1$. In this case there is no alteration in the length of the line traced out by the beam and the control of intensity is unaffected. In the general case where a change of scale occurs the computer may generate a voltage to alter the length of the bright-up pulses accordingly, for example, by means of a ramp circuit.

I claim:

1. Light beam steering apparatus, comprising:
   a light source generating a light beam to be steered by deflection thereof;
   steering mirror means located in the path of said light beam from said source and repositionable at a first speed for deflecting said light beam within a wide range of beam deflectng positions;
   servo-control means controlling said steering mirror means and comprising
   a. first input means for receiving command signals corresponding to a required mirror means position,
   b. feed-back input means connected to said mirror means for receiving feed-back position signals representing actual mirror means position,
   c. means connected to said first input means and said feed-back input means for generating error signals representing at each instant the departure of the actual mirror position indicated by the feed-back signals from the mirror position required by the command signals, and
   d. first means connected to said error signal generating means for controlling the movement of said mirror means in dependence upon said error signals;
   secondary beam control means simultaneously responsive to the same error signals as said mirror controlling means for simultaneously deflecting said beam before it reaches said steering mirror means, said secondary beam control means including
   a. a secondary deflection system positioned in the path of said light beam between said source and said steering mirror means for accurately deflecting said beam at a faster second speed within a narrower range of beam positions incident on the steering mirror means, and
   b. second means defining a secondary control circuit connected between said error signal generating means and said secondary deflection system and responsive to the same said error signals for causing said secondary deflection system to correct the beam position in accordance with said same error signals;
   whereby said secondary beam control means rapidly deflects, within its narrow range, the beam incident on the steering mirror means to dynamically compensate for instantaneous deflection error in the beam emerging from such steering mirror means, simultaneously with at least partial execution by the slower but wider range steering mirror means of moves toward each of a rapidly commanded series of beam deflecting positions.

11

2. Light beam steering apparatus as claimed in claim 1 in which the secondary deflection system comprises an electro-optical device.

3. Light beam apparatus as claimed in claim 1 wherein said steering mirror means comprises a steering mirror movable for beam deflection in at least one coordinate direction, and said feed-back position signals comprise a train of position pulses from the steering mirror and said servo-control means comprises, for said mirror, means for generating from the command signals a train of command pulses at a rate representing the required velocity of movement of the beam in the co-ordinate direction controlled by that mirror, and said error signal generating means comprises an error scaler for that co-ordinate direction to which the corresponding trains of feed-back pulses and command pulses are applied in opposition.

4. Apparatus as claimed in claim 3 in which the means for generating the train of command pulses comprise a buffer store into which the magnitude of a vector component of a desired movement can be placed and a binary rate multiplier supplied with the output of the buffer store and with rate-determining pulses from a clock common to the binary rate multipliers for both mirrors.

5. Apparatus as claimed in claim 3 including synch pulse controlled logic by which the train of feed-back pulses and the corresponding train of command pulses are synchronized to have a predetermined phase difference therebetween.

6. Apparatus as claimed in claim 1 in which said steering mirror means comprises a steering mirror and the means for controlling the movement of the mirror comprises an electromagnetic drive for the steering mirror comprising a drive coil, and a driving circuit for supplying a driving current to the drive coil, said driving circuit being controlled by said error signals.

7. Apparatus as claimed in claim 1 including further control means for said secondary deflection system comprising a matrix multiplication device and further including adding means connecting said control circuit and said further control means to said secondary deflection systme.

8. Apparatus as claimed in claim 7 including error signal generating means for each of first and second degrees of freedom of beam deflection, said further control means including additional error signal generating means for each said degree of freedom of beam deflection, said matrix multiplication device being coupled to said additional error signal generating means for receiving error signals therefrom and comprising a pair of multipliers for each said degree of freedom, each said pair receiving one such error signal, means applying multiplier values separately to said multipliers, one said adding means being provided for each such degree of freedom and being provided with inputs from a multiplier from each said pair and an error signal from said error signal generating means for one said degree of freedom of beam deflection, a given said adding means providing a combined error signal output to said secondary deflection system so as to superpose localized high speed control of the secondary deflection on the beam deflection control exercised by said servocontrol means and said secondary deflection system in combination.

9. Light beam steering apparatus as claimed in claim 8 including an oscillator having a pair of opposite polarity outputs and switch means coupling such opposite polarity outputs to the outputs of respective ones of said adding means in response to absence of command signals for causing said beam to execute a small circular movement when it would otherwise be idle and further including means for blocking said beam when executing such small circular movment.

10. Light-beam steering apparatus as claimed in claim 1 wherein said feedback input means is coupled to said steering mirror means by first and second feedback generating means, one for each coordinate direction of deflection of said mirror means, each of said feedback generating means comprising a Michelson interferometer device having one member which moves with the steering mirror means and a fringe counter for counting the movement of the interference fringes resulting from changes in the position of the mirror, the output of said fringe counter forming the feedback position signals for control of the movement of the mirror in the corresponding coordinate direction.

11. Apparatus as claimed in claim 1 in which said first input means comprises a binary rate multiplier for receiving magnitude command signals, means applying rate determining clock pulses, representing the required speed of movement of the beam, to said binary rate multiplier, a pair of AND gates responsive to the output signal of said binary rate multiplier and means alternatively applying a further input to said AND gates in accord with the sign of the required direction of beam movement, and wherein said means for generating error signals includes a pair of OR gates driven by respective ones of said AND gates and an error scaler energizable in one direction by one said OR gate and energizable in the opposite direction by the other of said OR gates, said feedback input means including further AND gates alternatively actuable in response to the actual movement of said steering mirror means in opposite directions, said further AND gates being coupled to repective further inputs of said OR gates, a clock source for supplying out of phase sync pulses and synchronizing means responsive to said feedback position signals and providing gating outputs to said further AND gates for causing same to slightly delay and synchronize passage of said feedback position signals therethrough to said OR gates, said means for controlling the movement of the mirror means including a drive circuit responsive to the output of said error scaler.

12. Light beam steering apparatus as claimed in claim 11, including a third pair of AND gates responsive to respective ones of said OR gates, a pair of flip-flops having inputs from respective ones of said third AND gates and having clock inputs from opposite ones of said OR gates and including output gate means for each of said pair of flip-flops further responsive to ones of said OR gates and means coupling said output gate means to said driving circuit for applying a relative velocity signal to said driving circuit to so increase mirror driving current that movement of the mirror away from its prescribed position is rapidly damped, said relative velocity signal representing the actual velocity of the mirror relative to its prescribed velocity.

13. Light beam steering apparatus comprising a light source emitting a light beam, means comprising a pair of steering mirrors in the path of said light beam for steering the beam, a secondary deflection system in the path of said beam between said source and steering mirrors for deflecting said beam prior to incidence on said steering mirrors, mirror control means for said steering mirrors, interferometer means connected to each of said mirrors to detect movement thereof, fringe-counting means connected to said interferometer means to generate a digital signal representing the position of each of said mirrors, feed-back means feeding said digital position signals to said mirror control means, means applying digital position command signals to said mirror control means, said mirror control means comprising an error-detecting means receiving said digital position command signals and for generating an error signal representing the difference between the position command signals and the digital position signals from the fringe-counting means, means applying said error signal to said secondary deflection system for controlling beam deflection thereby, driving means for moving said mirrors, said mirror control means further comprising drive circuit means responsive to said error signal for supplying drivin currents to said driving means, an intensity modulator also in the path of said beam and means for deriving a velocity signal representing the speed of movement of the beam and means applying said velocity signal to said intensity modulator for compensating beam intensity for increased beam deflection velocity.

14. Light beam steering apparatus comprising a light source generating a light beam to be steered, a main deflection system comprising a pair of steering mirrors positioned in the path of the light beam from the source and movable for deflecting the beam through a range of deflection, servo-control means controlling said mirrors and comprising (a) first input means for receiving command signals representing a series of commanded steering mirror position, (b) feed-back input means coupled to the mirrors to receive feed-back position signals representing actual steering mirror positions, and (c) output means coupled to and effecting synchronous displacement of the steering mirrors for displacing the light beam toward successively commanded positions defining a pattern, (d) means responsive to said first and feed-back input means for generating an error signal representing the departure of the actual position of the mirrors from the desired position and applying said error signal to said output means, and (e) means generating a signal representative of beam tracing velocity, an intensity modulator in the path of the light beam, means connecting said intensity modulator to said control means and responsive to said velocity signal for causing the intensity modulator to positively compensate the intensity of the light beam for instantaneous differences in said tracing velocity, a secondary deflection system also in the path of the light beam and preceding said steering mirrors for deflecting the beam prior to incidence on said steering mirrors, means defining a secondary control circuit coupled between said control means and said secondary deflection system and responsive to the same said error signal moving said steering mirrors for causing said secondary deflection system to simultaneously correct the position of the beam in accordance with said error signal and in compensation for lags in steering mirror movement.

15. Apparatus as claimed in claim 14 in which each steering mirror has means for generating a position feed back signal in the form of a train of position pulses and the servo control means comprises, for each mirror, means for generating a train of command pulses at a rate representing the required velocity of movement of the beam in the co-ordinate direction controlled by that mirror, the two trains of pulses being applied in opposition to an error scaler which determines the direction in which the mirror is driven in dependence upon the position of the mirror relative to that commanded by the command pulses.

16. Apparatus as claimed in claim 15 wherein the means for generating the train of command pulses comprise a buffer store into which the magnitude of a vector component of a desired movement can be placed and a binary rate multiplier supplied with rate-determining pulses from a clock common to the binary rate multipliers for both mirrors and with the output of the buffer store.

17. Apparatus as claimed in claim 15 in which the two trains of pulses are synchronized to have a predetermined phase difference therebetween.

18. Apparatus as claimed in claim 15 in which the servo-control means comprises means for comparing the two trains of pulses to determine the direction of movement of the mirror relative to the movement prescribed by the command pulses, said means being connected to decrease the driving force applied to the mirror when it is moving towards the instantaneous prescribed position.

19. Apparatus as claimed in claim 15 in which the means for generating a position feed back signal comprise a Michelson interferometer device one member of which moves with the mirror and a fringe counter for counting the movement of the interference fringes resulting from change in position of the mirror.

20. Apparatus as claimed in claim 15 wherein each mirror has an electromagnetic drive including a drive coil connected to a driving circuit which supplies a driving current to the drive coil, the driving circuit being controlled by the error scaler.

21. Apparatus as claimed in claim 14 in which the secondary deflection system comprises an electo-optical device.

22. Apparatus as claimed in claim 20 in which the servocontrol means comprises comparison means connected to receive the two trains of pulses and coupled to the driving circuit to supply thereto relative velocity signals representing the direction of movement of the mirror relative to the movement prescribed by the commmand pulses, said relative velocity signals acting to decrease the driving current when the deviation of the mirror from the prescribed path is decreasing.

* * * * *